Sept. 20, 1960 M. R. SCHROEDER 2,953,645

GENERATION OF INTERPOLATION WAVES

Filed Aug. 18, 1958 2 Sheets-Sheet 1

INVENTOR
M. R. SCHROEDER
BY Harry C. Hart
ATTORNEY

Sept. 20, 1960 M. R. SCHROEDER 2,953,645
GENERATION OF INTERPOLATION WAVES
Filed Aug. 18, 1958 2 Sheets-Sheet 2

INVENTOR
M. R. SCHROEDER
BY Harry C. Hart
ATTORNEY

United States Patent Office 2,953,645

Patented Sept. 20, 1960

2,953,645

GENERATION OF INTERPOLATION WAVES

Manfred R. Schroeder, Murray Hill, N.J., assignor to Bell Telephone Laboratories, Incorporated, New York, N.Y., a corporation of New York Filed Aug. 18, 1958, Ser. No. 755,764

13 Claims. (Cl. 179—15.55)

This invention deals with wave generating apparatus. It has for a specific object the generation of a smooth wave composed of a sequence of segments, fitted together along a time axis and having broadly similar characteristics but different durations. Such a wave is required for the reconstruction of a message wave from a sequence of discrete samples of like portions of the original wave, for example its peaks or its zeros. Since such portions of the original wave occur in a highly irregular fashion, the pulses representing their instants of occurrence are similarly irregular, both as derived at a transmitter station and as received at a receiver station.

A system for the reconstruction of a speech wave from an incoming sequence of code pulse groups representing the instants of occurrence of the successive extreme amplitudes, i.e., upward and downward peaks, of a speech wave, transmitted over one channel and from associated code pulse groups each representative of the amplitude of one such peak, transmitted over another channel by interpolation of a smooth curve between each sample and the next is disclosed in an application of M. V. Mathews, Serial No. 684,993, filed September 19, 1957.

An important step in the generation of such a smooth interpolation wave is to generate an auxiliary irregular sawtooth wave, i.e., a wave in which the slope of each sawtooth is inversely related to the duration of that sawtooth.

Accordingly, a more general object of the invention is to generate a wave of which some major feature, e.g., its amplitude or its slope, is inversely related to some feature, e.g., the duration, of an input signal.

Such a wave is useful not only as the input to an interpolation wave generator but in many other fields as well. One example of such a field is in the control of a variable speed scanning operation in a television system. Another example is found in the apparatus for the location of distant objects by radar techniques. An instance of the former situation is disclosed in J. C. Wilson Patent 2,777,192, March 24, 1942. An instance of the latter one is disclosed in A. S. Bishop Patent 2,715,182, August 9, 1955.

The problem of generating, from an irregular sequence of incoming pulses, each representing the instant of occurrence of one sample of an original message wave, a sequence of artificial smooth waves of generally similar character and of unequal durations for interpolation in the unequal intervals between the successive wave sample pulses, one in each intersample interval, is not a simple one, especially when the intersample intervals are of widely different durations. This problem is advantageously approached in three steps. First, there is generated an intermediate wave having the form, when plotted, of a succession of rectangular blocks, each block having the duration of a corresponding one of the intersample intervals, and an amplitude inversely related to the duration of the block and essentially constant throughout such duration. This wave thus changes abruptly, at each sampling instant of the original wave, from one amplitude to the next; and the shorter blocks are of relatively large amplitudes while the longer blocks are of relatively small amplitudes.

Second, this wave is subjected to an integration process which commences at the beginning of each intersample interval and continues to the end of that interval, to be recommenced for the next block after a reset operation that takes place at the completion of the interval. This integration process produces an auxiliary wave having the form, when plotted, of an irregular succession of sawteeth, all of like amplitudes, each of duration equal to that of the corresponding block of the first auxiliary wave, and each having a slope inversely related to its duration.

In particular, if the successive instants at which the samples of the original message wave are taken be nummered in order 1, 2, 3 . . . $i-1$, $i$, $i+1$ . . . then the interval, on the time scale, between any specified sample and the following one may be designated.

$$\Delta t_i = t_{i+1} - t_i$$

The sawtooth wave for this particular interval rises at a constant rate, starting at a value zero and reaching the value unity at the conclusion of this interval, and its amplitude, at each instant, is therefore defined by the expression $$y = \frac{t - t_i}{t_{i+1} - t_i} \qquad (1)$$

The expressions representing the several sawteeth are of like form, the designator $i$, however, taking on a different value for each tooth.

Third, this irregular sawtooth wave is applied as an input signal to an interpolation function generator. This unit is preferably adjusted to deliver, for each sawtooth portion of its input signal, a smooth interpolation wave, and to fit such wave portions together at their end points to produce a smooth, unbroken wave for the message sample sequence as a whole. When, as in the case of a preferred illustrative embodiment of the invention, it is required to generate a wave for interpolation between successive variously spaced samples of like amplitudes, each taken at an upward-going peak or maximum value of the original wave, a single full cycle of a cosine wave is evidently suitable. In accordance with the invention in one of its aspects a good approximation to such cosine wave is represented by the expression.

$$W = 3x^2 - 2x^3 \qquad (2)$$

where $$x \equiv 2|y - \tfrac{1}{2}| \qquad (3)$$

and $$y \equiv \frac{t - t_i}{t_{i+1} - t_i} \qquad (1)$$

A simple computing circuit is provided to generate a wave having the functional form of Equation 2, the sawtooth wave output of the integrator which is given, for the interval extending from the $i$th sample to the $(i+1)$th sample, by Equation 1, having first been modified by the addition of a bias of appropriate magnitude, subsequent full wave rectification and doubling of amplitude as indicated by the term "½", the vertical bars, and the factor 2 in Equation 3.

In accordance with a principal feature of the invention the first auxiliary wave which, when integrated, becomes an irregular sawtooth wave, is derived in the following fashion. The entire irregular sequence of incoming pulses, each of which marks one of the peak-sampling instants of the original message wave, is applied to a storage device from which each pulse of the sequence is withdrawn through a circuit arrangement by virtue of which each pulse, as withdrawn, is increased in amplitude monotonically with the length of its sojourn in the storage device, and preferably in accordance with a hyperbolic law of growth. From time to time, and under control of each pulse as it emerges from the storage device, all the pulses then within the device are sampled, the largest one is picked, and its amplitude is held constant until the emergence of the next pulse from the storage device. By virtue of the monotonic law of growth the pulse thus picked is the immediate successor of the emergent pulse which controls the picking operation; and by virtue of the hyperbolic law of growth if, as is preferable, the apparatus be constructed to embody it, the amplitude of the pulse thus picked and held is inversely proportional to the interval which separates the picking pulse from the picked pulse; i.e., each picked pulse is of an amplitude inversely proportional to the interval which separates the picking pulse from the picked pulse; i.e., each picked pulse is of an amplitude inversely proportional to the interval which separates it, on the time scale, from its immediate predecessor.

The invention will be fully apprehended from the following detailed description of a preferred illustrative embodiment thereof, taken in connection with the appended drawings, in which.

Figure 1:
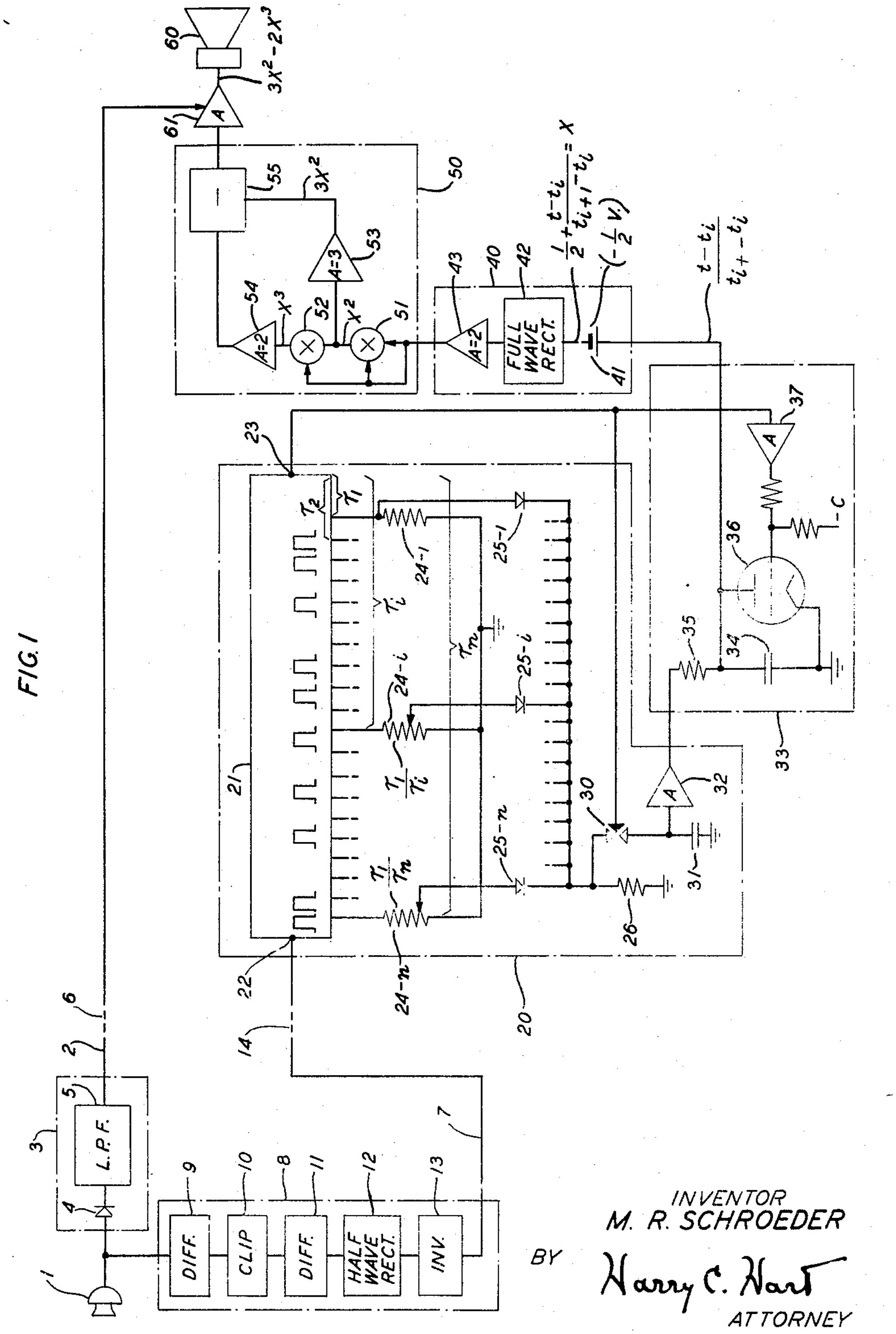
Fig. 1 is a schematic circuit diagram, partly in block form, illustrating a speech transmission system embodying the invention.

Referring now to the drawings, Fig. 1 illustrates a system, embodying the invention, for the transmission of a message wave by way of two independent channels of which one carries only amplitude information while the other carries only information as to the instants of occurrence of the peaks of the message wave. The message wave to be transmitted may be, for example, a speech wave originating in a microphone 1. Such a wave is depicted in the solid curve A of Fig. 2. The apparatus of Fig. 1 divides it into two paths, in the upper one 2 of which an envelope detector 3 operates to preserve that part of the information in the original message wave which appears as variations of its amplitude; i.e., its envelope, indicated by a broken line that embraces the peaks of the curve A of Fig. 2. The envelope detector 3 may conveniently comprise a rectifier 4 connected in tandem with a filter 5. This filter may be proportioned to have a time constant of the order of $\frac{1}{300}$ second or so, thus to pass components of pitch and syllabic frequencies and to block components of other frequencies.

The envelope wave thus derived is transmitted, by appropriate techniques, over a medium 6 to a receiver station for use as described below.

A principal element of the lower path 7 is a phase detector 8. Its function is to identify the instant of occurrence of each positive peak of the message wave applied to it, to deliver a pulse at each such instant, and to discard other information-bearing features such as amplitude variations, instants of occurrence of downward-going peaks, and the like. In its simplest form it may comprise merely a first differentiator 9, a clipper 10, a second differentiator 11 and a half wave rectifier 12 connected together in the order named. As is well known, each positive peak of the signal occurs at the same instant as does a downward-going zero value of its first derivative. The first derivative wave produced by the differentiator 9 is in turn clipped by the clipper 10 and the sharply rising or falling portions of the clipped wave are in turn reflected in positive or negative spikes at the output point of the differentiator. If, as in the example taken, only positive message wave peaks are to be retained, the rectifier which follows the second differentiator may be poled and proportioned to nullify or discard the positive spikes, retaining only the negative spikes, each of which occurs at the instant of occurrence of a corresponding one of the positive message wave peaks. They may be inverted in polarity by an inverter 13, after which operation a train of such pulses appears as shown in graph B of Fig. 2, for the message wave depicted in graph A of Fig. 2.

The resulting train of unipolarity pulses, all of the same magnitude and spaced irregularly on the time scale, may be transmitted over a medium 14 to the receiver station where, after such amplification or regeneration in accordance with techniques well known in the art as may be desirable, they are applied to the input terminal of an interval reciprocator. It is the function of this apparatus to derive, from the incoming pulse train, the first auxiliary wave, illustrated in graph C of Fig. 2.

The reciprocation of each of the successive interpulse intervals, or in other words the derivation of a signal wave of which some portion is, at each instant, inversely related to the length of the interpulse interval, is effected through the agency of a temporary storage device of capacity sufficient to store two successive pulses which bound the longest interpulse interval to be expected, combined with means for picking, at each of a succession of sampling instants, the earliest pulse stored in the device. The better to pick such earliest pulse, provision is made to translate storage time into magnitude in accordance with a monotonic, and preferably hyperbolic, law of growth. The pulse of greatest magnitude may readily be picked by known techniques; and, with this arrangement, the pulse so picked is the earliest one and its magnitude is inversely related to the interval separating it from its immediate predecessor which controls the picking operation.

In greater detail and more specifically, the interval reciprocator 20 comprises a wave propagation device or so-called delay line 21 which may be constructed in conventional fashion of series inductors and shunt capacitors and terminated at its far end in its characteristic impedance to minimize reflection. It is provided with an input point 22, an output point 23, and a plurality of lateral taps spaced, preferably uniformly, along its length. Each of these is represented, for simplicity of illustration, as a single-line transmission path. As a practical matter, such path will presumably be instrumented with the aid of wire pairs or other energy-conducting channels. The same remark applies also to other parts of the figure, discussed above and to be discussed below.

In series with each output tap a multiplier is connected, shown illustratively as a simple potentiometer 24–*l* . . . 24–*i* . . . 24–*n*. The multiplication factors of the several multipliers 24 are graded from a smallest value for the tap closest to the input point 22 of the line 21 to a largest value, namely unity, for the tap closest to the output point 23 of the line. The location of each tap is designated by the delay contributed by the line between that tap and the output point 23. Thus, the delay $\tau_1$ is associated with the tap lying closest to the output point 23, i.e., furthest to the right in the figure, the delay $\tau_2$ is associated with the next tap to the left of that one, and the delay $\tau_N$ is associated with the tap lying closest to the input point 22.

As a refinement, the grading of the multiplier factors of the multipliers 24 follows a hyperbolic law wherein the origin coincides with the output point 23 of the delay line 21. Thus, the factor associated with the right-hand tap is $$\frac{\tau_1}{\tau_1}$$

or unity, the factor associated with the tap next to the left of it is $$\frac{\tau_1}{\tau_2}$$

and so on for each tap of the group, the factor for the left-hand tap being thus $$\frac{\tau_1}{\tau_N}$$

Figure 3:
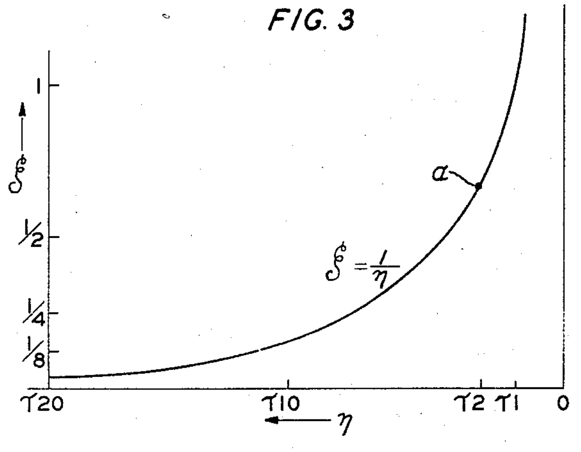
Fig. 3 is a graph showing the transfer characteristic of a portion of the apparatus of Fig. 1.

Fig. 3 shows, to an arbitrary scale, an equilateral hyperbola of which the ordinate extends upward while the abscissa extends postively in a left-hand direction from the origin. The amplitude of any point on this curve is inversely proportional to the distance of the corresponding point of the abscissa from the origin. Points on this curve located above points of the abscissa corresponding to the locations of the several taps therefore give, in relative magnitudes, the amplitudes of the outputs of the several taps after modification by the several multiplier-potentiometers 24, each according to its own multiplication factor.

The output points of the several multipliers are connected to the several anodes of a group of diodes 25 and the cathodes of these diodes are connected together and by way of a common resistor 26 to a fixed potential point, indicated as ground.

Figure 2:
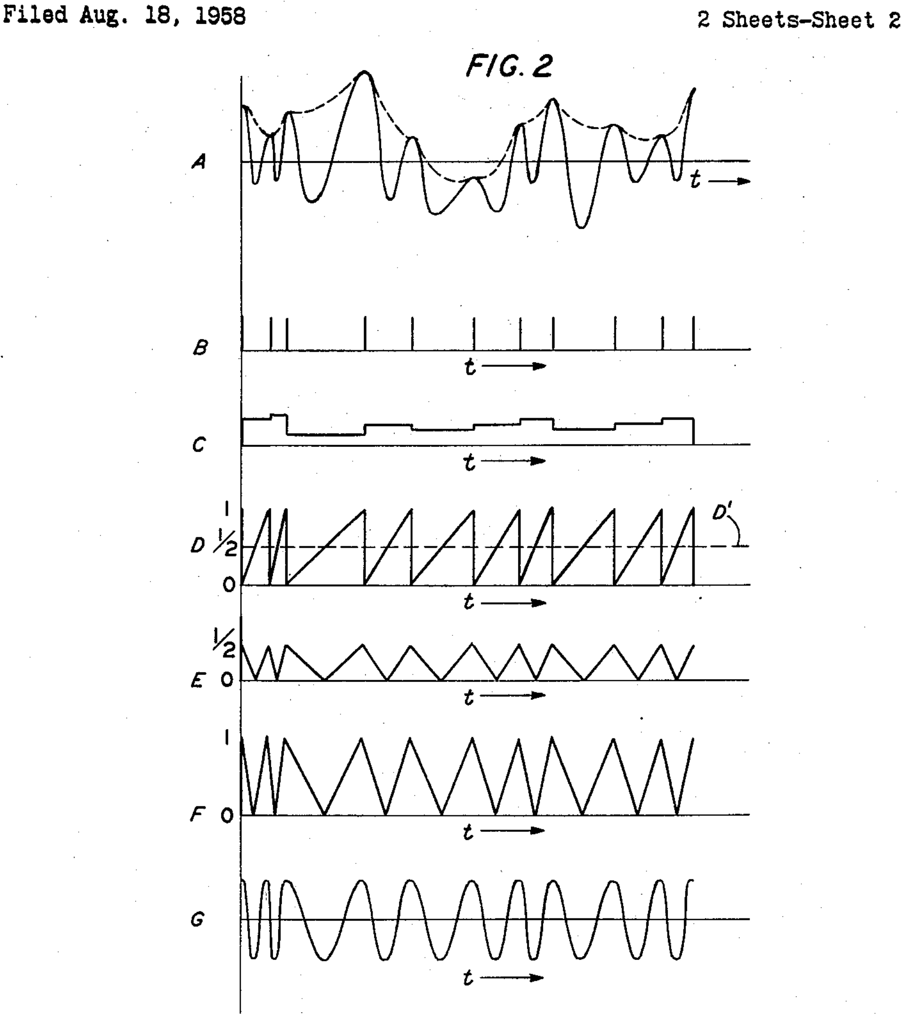
Fig. 2 is a group of wave forms illustrative of the operations carried out by the various apparatus components of Fig. 1.

There is indicated within the delay line a train of pulses of the same distribution as that shown in graph B of Fig. 2. They are of widths such that each of them overlaps at least one of the lateral taps of the delay line 21. If, as received, they should be too short for such overlap, they may readily be stretched by a regenerator or a filter. They are to be understood as having entered line 21 from the left, and one by one, and to be traveling at equal and uniform speeds from left to right from the input point 22 toward the output point 23. Hence the right-handmost pulse within the delay line 21 is the earliest of the pulses momentarily within the line while another pulse, which has just emerged from the delay line and appears at its output point 23, is a still earlier one. Each pulse passes all of the lateral taps in its progress from the input end of the line to the output end. As it does so it gives rise to output signals on the several taps, sequentially. Because the taps are uniformly spaced these output signals, for each single pulse, are uniformly spaced apart on the time scale.

At the moment when the pulses are distributed in the delay line 21 as depicted in the figure, the earliest pulse embraced within the delay line is centered on the tap designated $\tau_2$. The output of this tap, after modification by the multiplier, is thus proportional to the amplitude of the point *a* in Fig. 3. Another pulse overlaps the third tap, another overlaps the fifth tap, and the most recent pulse of all overlaps the *n*th tap. Still other pulses are distributed between the first tap and the last. The outputs of these other taps at this moment, as modified by the potentiometers, are likewise given by the amplitudes of the corresponding points of the curve of Fig. 3 and, because of the grading of the multiplication factors introduced by the potentiometers 24, all are less in magnitude than the output of the second tap. The output of this second tap passes the second of the diodes 25, tending to hold it in its conducting state. The signal passed by this diode then appears across the common resistor 26 which operates to hold all the other diodes in their nonconducting states. Hence the potential of the upper terminal of the common resistor 26 rises to the level indicated by the point *a* of Fig. 3. This level is that of the tap output which, as modified by its multiplication factor, is the greatest. By virtue of the monotonic grading among the multiplication factors, this tap is the one that carries an output from the earliest pulse embraced within the line 21.

At this moment the potential of the upper terminal of the common resistor 26 is sampled under control of a still earlier pulse that has just emerged from the line 21. The sampling operation may be carried out by any convenient apparatus, here conventionally shown as a three-terminal switch 30 of which two conduction terminals are represented by arrowheads pointing toward each other while a control terminal is represented by a third arrowhead pointing toward the junction point of the first two. At the sampling instant, therefore, and by virtue of the hyperbolic grading law, the potential sampled is inversely proportional to the time interval that separates the earliest pulse embraced within the line 21 and its emergent predecessor.

The lower conduction terminal of this sampling switch 30 is connected to a hloding circuit, here shown for the sake of simplicity of illustration as a condenser 31 connected between the output terminal of the sampling switch 30 and ground. The holding circuit, which in practice may be more refined, operates to preserve, for example as a potential on the holding condenser 31 the signal momentarily derived across the common resistor 26 by application of a sampling pulse to the control terminal of the switch 30. Hence the potential of the upper condenser terminal changes abruptly on the emergence of each pulse of the train from the output point 23 for the delay line 21, remaining constant throughout each interpulse interval at the same potential as that of the upper terminal of the common resistor 26 at the sampling instant. The potential variations of this condenser 31 thus have the form of the graph C of Fig. 2. Furthermore, these amplitudes, constant from pulse to pulse, are individually inversely related to the durations of the interpulse intervals. Thus, for example, the second section is higher, as well as shorter, than the first while the third section is lower, as well as longer, than either the first or the second. In particular, the relation between the amplitudes of these individual wave portions and their representative durations is an exact inverse proportion. Hence the area of each one, namely, the product of its length by its height, is the same as that of every other one.

The potential of the upper terminal of the holding condenser 31, i.e., the wave C of Fig. 2 is now applied, preferably by way of a buffer amplifier 32 which is included to minimize the loading of the condenser 31, to an integrator circuit 33. The latter may be of any desired construction, a simple and suitable one comprising a series combination of a condenser 34 and a resistor 35 through which the condenser is charged, throughout each interpulse interval, by a current derived from the buffer amplifier 32 and discharged at the conclusion of the interval. To control these operations a triode 36 is provided with its anode-cathode path connected to the two terminals of the charging condenser 34. During charging operation the triode 36 is held in a nonconductive condition by the application of a steady negative bias to its control element. The condenser 34 then proceeds to charge, at the inception of each interval, from zero potential toward a higher potential and at a rate proportional to the potential of the holding condenser 31. At the conclusion of the interval, the pulse emerging from the output point 23 of the delay line 21 is applied by way of an amplifier 37 to the control element of the triode 36, thus rendering it strongly conductive, whereupon the condenser 34 is abruptly discharged, to recommence its charging operation at a new rate for the next interpulse interval.

Thus, the potential of the charging condenser 34, when plotted as a function of time, appears as shown in graph D of Fig. 2. That is to say, it is a sawtooth wave, the length of the base of each tooth coinciding with one interpulse interval and the slope of the rising portion of that tooth being inversely related to its base length; that is the shorter the tooth, the steeper the rise.

It has been explained above that, when the multiplier factors of the various taps of the delay line are graded hyperbolically the areas of the several blocks of the graph D of Fig. 2 are alike. With this refinement the amplitudes of the various sawteeth of graph D are also alike; i.e., they all rise to a common level before falling abruptly to zero. Provided only that the output of the integrator 33 extends from zero to unity, each sawtooth of the graph D has the form $$y=\frac{t-t_i}{t_{i+1}-t_i} \quad (1)$$

in which case the sawtooth for each interval reaches the magnitude unity precisely at the conclusion of that interval. If preferred, therefore, the condenser 34 may be discharged without the assistance of the pulses emerging from the output point 23 of the delay line 21, but rather through the agency of a threshold-responsive device which renders the discharge tube 36 conductive each time the potential of the condenser 34 reaches a preassigned threshold. By virtue of the exact inverse relation between slope and duration for the sawteeth of graph D the result is the same.

The sawtooth wave thus derived by the integrator 33 may be employed in various ways. It may be applied, for example, without change to an arbitrary wave function generator. Several devices of this character are known which are capable of accepting, as their input signals, waves having the form shown in graph D of Fig. 2. One such device, which utilizes a cathode beam and an anode having a contour of arbitrary shape so that the anode current is related to the contour of the mask is disclosed in Hartley Patent 2,189,898, February 13, 1940. Another such device, which utilizes a plurality of diodes and adjustable means for variously grading their breakdown thresholds is manufactured and sold by George A. Philbrick Researches, Inc., of Boston, Massachusetts.

For the present purposes, however, it is preferred to generate the interpolation wave in a different fashion, namely by computation techniques, as follows:

It is known that for a variable quantity $x$ which changes at a constant rate through a range extending from zero to unity, a wave having, to a very close approximation, the same form as a half cosine wave over the range 0–$\pi$, is given by $$f=3x^2-2x^3 \quad (4)$$

For the present purposes it is required to interpolate between each sampling instant and the next a single full cycle of a cosine wave, in contrast to one half of such a wave. But the abrupt discontinuities of the wave output of the integrator 33 (graph D of Fig. 2) are such that successive half cosine waves, or close approximations thereto in accordance with Equation 4 would, without more, fail to fit together at their end points. This difficulty, however, can be circumvented by first modifying the output of the integrator 33 to convert the sawtooth wave, graph D, into a triangular wave of particular form, graph E. This conversion may be effected in various ways, e.g., by a modifier circuit 40 which comprises a source of fixed potential such as a battery 41, a full wave rectifier 42 and a multiplier 43 connected in tandem. The battery 41 is proportioned to introduce, in series with the output of the integrator 33, a negative bias equal to one half the average peak amplitude of the sawtooth wave, graph D. In the particular case in which the sawtooth wave extends from 0 to unity, this half-peak bias is ½ volt. This, in effect, displaces the horizontal axis from which the potential of the wave is measured to the position indicated by the broken line D′, so that potentials in the path beyond this battery 41 are negative during the first half of each sawtooth rise of curve D and positive thereafter.

Application of this wave, having negative values as well as positive ones, to the full wave rectifier 42 changes each negative potential, with its positive slope, to an equal positive potential with a negative slope, leaving all positive potentials and their slopes unchanged. Hence, the output of the full wave rectifier 42 may be designated as the absolute value of the output of the integrator 33, as diminished by the bias. Its form is shown in graph E of Fig. 2. Its range is one half that of the sawtooth wave: ½ volt in the example. To bring it to the proper range, its excursions are normalized to occupy the range 0–1 volt; that is, in the example, by an amplifier 43 of gain factor 2. The amplifier output, which now covers the range zero to unity, is represented in graph F of Fig. 2, and is given by Equation 3. Application of the wave of graph F to a computer constructed to generate the interpolation function defined by Equation 4 results in the generation, by this computer, of a single full cycle of a wave having closely the form of a full cosine wave, for each interpulse interval.

A suitable computer is indicated in the box 50. The output of the modifier 40, given by the Equation 3, is applied to the two input points of a first multiplier 51 which thereby delivers at its output point the quantity $x^2$. This quantity is in turn applied to one input point of a second multiplier 52, to the other input point of which the quantity $x$ is applied. The output of the second multiplier 52 is thus $x^3$. The quantity $x^2$ is now multiplied by a factor 3 by an amplifier 53 having a gain factor of 3, while the quantity $x^3$ is similarly multiplied by a factor 2 by another amplifier 54 of gain factor 2. The output of the second amplifier 54 is now subtracted from the output of the first amplifier 53 by a subtractor 55 of any desired sort, to give, finally $$f=3x^2-2x^3 \quad (4)$$

As a practical matter the subtractor 55 may conveniently comprise an adder of any desired sort supplemented by means for inverting the polarity of one of its two input quantities.

The output of the subtractor 55, for a sequence of sawteeth of the wave D of Fig. 2, is now a smooth curve, as indicated in graph G of Fig. 2, of sporadic wave length and uniform amplitude. It will be noted that each full cycle of this wave is symmetrical about its null point, but dissymmetrical about its peak. This is in consequence of the same symmetries and dissymmetries of the wave F.

This wave, graph G of Fig. 2 may, if desired, be applied to a message reproducer 60 without further modification. However, inasmuch as the amplitude information derived at the transmitter station and transmitted over the amplitude channel 2 requires only a very narrow frequency band for its transmission, it is preferred to retain such amplitude information, using apparatus such as shown in Fig. 1 to derive it, to transmit it over such a narrow band and, at the receiver station, to utilize it to restore the amplitude variations, present in the original message wave. This may be accomplished in any desired fashion, for example, by the employment of a variable gain amplifier 61 having an input terminal, an output terminal, and a gain control terminal. Application of the uniform amplitude wave output of the interpolation function generator 50, graph G of Fig. 2, to the input point of the amplifier 61 and simultaneous application to its control terminal of the envelope signal (the broken line in graph A of Fig. 2) gives rise, at the input terminal of the reproducer 60, to a wave closely resembling the original speech wave.

At the sacrifice of some of the information carried by the incoming pulse train the number of its pulses may be substantially reduced, in accordance with any desired program, with a proportional saving in frequency space or time required for their transmission. Thus a 2 to 1 saving in bandwidth may be effected by discarding alternate pulses, for example even numbered pulses, retaining only the odd numbered pulses. The discard and retention may be effected at the transmitter station in well known fashion, e.g., by the use of a scale-of-two counter of any desired sort. The receiver apparatus then responds to this modified pulse train by the generation of a sawtooth wave having the same general form as that of the wave D of Fig. 2 but, on the average, twice as long a base length and half as great a slope for each tooth.

To reconstruct an approximation to the original smooth message wave from such an irregular train of odd numbered pulses only, an interpolation wave generator may be constructed to generate two full cycles of a cosine wave for each such sawtooth. A wave generator of the type shown in the Hartley patent above referred to lends itself readily to the generation of such an interpolation wave.

For particular purposes, interpolation waves of entirely different character may be advantageous. For example it may be desired under some circumstances to transmit only one out of a sequential group of five or ten pulses, and, at the receiver, to interpolate four, or nine, pulses in the interval between each two consecutive received pulses. These interpolated pulses may divide the interval into like subintervals or into unlike ones as desired. A subtrain of such pulses may readily be generated, for such interpolation, by application of the sawtooth wave to a bank of diodes with graded breakdown thresholds. The subpulses may be derived from the several diodes, one on the breakdown of each diode of the group.

Various other modifications and extensions of the illustrative embodiment shown and described above are possible.

What is claimed is:

1. In combination with a source of a temporally irregular sequence of pulses of like amplitudes, means for interpolating, in each interpulse interval, a smooth wave extending throughout said interval and having the general form of a single full cycle of a cosine wave, which comprises means for generating a first auxiliary wave composed of an irregular succession of sawtooth-shaped portions, each coinciding with one of said interpulse intervals and having a rising side of slope inversely related to its duration and an abruptly falling side, means for converting said first auxiliary wave into a second auxiliary wave composed of a succession of triangle-shaped portions, the falling side of each triangle having a slope that is equal in magnitude and opposite in sign to the slope of the rising side of the next following triangle, means for normalizing the amplitude of said second auxiliary wave to extend between the value zero and the value unity, an interpolation wave generator proportioned to deliver, in response to an input wave extending from zero to unity, a smooth wave extending from a first condition of zero amplitude and zero slope, through an intermediate condition of half amplitude and maximum slope, to a final condition of unit amplitude and zero slope, and means for applying said second auxiliary wave, as normalized, as an input signal to said interpolation wave generator.

2. Apparatus as defined in claim 1 wherein said means for generating the first auxiliary wave comprises means for generating, for each interpulse interval, an intermediate wave of amplitude that is fixed throughout that interval at a magnitude inversely related to the duration of said interval, said wave being characterized by abrupt changes of amplitude at the instants of occurrence of at least some of the pulses of said sequence, and means for integrating each fixed amplitude portion of said intermediate wave over the interpulse interval that it occupies.

3. Apparatus as defined in claim 1 wherein said interpolation wave generator is proportioned to generate, in response to an input signal $x$, a wave having the functional form $$f=3x^2-2x^3$$

4. Apparatus as defined in claim 1 wherein the means for deriving the second auxiliary wave from the first auxiliary wave comprises means for subtracting, from each sawtooth of the first auxiliary wave, a bias of one half the average of the amplitudes of the peaks of said sawtooth wave to provide a first intermediate wave having negative portions as well as positive portions, a full wave rectifier disposed to convert each negative portion of said first intermediate wave into a positive portion of negative slope, thereby to provide a second intermediate wave having the form of an irregular sequence of dissimilar triangles, the rising side of each triangle having a slope equal to that of the rising side of the corresponding sawtooth of the first auxiliary wave, the falling portion of each triangle having a slope that is equal in magnitude and opposite in sign to the slope of the rising portion of the next following sawtooth of the first auxiliary wave, and means for normalizing the amplitude of the second intermediate wave to extend between the zero magnitude and unit magnitude, thereby to provide a second auxiliary wave for application as an input signal to said interpolation wave generator.

5. In combination with a source of a temporally irregular sequence of pulses of like amplitudes, means for interpolating, in each interpulse interval, a smooth wave extending throughout said interval and having the general form of a single full cycle of a cosine wave which comprises means for generating a first auxiliary wave composed of an irregular succession of sawtooth-shaped portions, each coinciding with one of said interpulse intervals and having a rising side extending from zero amplitude to unit amplitude and of slope inversely related to its duration and an abruptly falling side, means for converting said first auxiliary wave into a second auxiliary wave composed of a succession of triangle-shaped portions, the rising side of each such portion extending from zero amplitude to unit amplitude and being of twice the slope of the rising side of the corresponding portion of said sawtooth wave, the falling side of each such portion extending from unit amplitude to zero amplitude and being of a slope that is equal in magnitude and opposite in sign to the slope of the rising side of the next following triangle-shaped portion, an interpolation wave generator proportioned to deliver, in response to an input wave extending from zero to unity, a smooth wave extending from a first condition of zero amplitude and zero slope, through an intermediate condition of half amplitude and maximum slope, to a final condition of unit amplitude and zero slope, and means for applying said second auxiliary wave as an input signal to said interpolation wave generator.

6. Wave transmission apparatus which comprises, in combination, a transmitter station, a source, located at said station, of an original message wave characterized by a temporally irregular succession of amplitude peaks, two energy paths connected in parallel to said source, means in one of said paths for deriving a phase signal comprising a sequence of pulses, each occurring at the instant of an upward-going amplitude peak of said original message wave and for discarding amplitude characteristics of said message wave, means in the other path for deriving an envelope signal representative of the amplitude characteristics of said wave and for discarding its phase characteristics, a receiver station, means for individually transmitting said envelope signal and said pulse sequence to said receiver station and, at said receiver station, means for interpolating a smooth wave, having the approximate form of a single full cycle of a cosine wave, in each interpulse interval and extending from each received pulse to the next pulse, and means for amplitude-modulating the output of said interpolating means under control of said envelope signal.

7. In combination with a source of an incoming temporally irregular train of pulses, each occurring at the instant of an upward peak of a message wave, means for reconstituting said message wave from said pulse train, which comprises, means for generating an auxiliary wave of successive portions, each of triangular form and of unit amplitude, the apices of the successive triangles occurring at the instants of the successive pulses of the train and each zero of the auxiliary wave lying midway between two adjacent apices, an interpolation wave generator proportioned to generator, in response to a signal $x$, a wave having the functional form $$f=3x^2-2x^3$$

and means for applying said auxiliary wave as an input signal to said interpolation wave generator.

8. In combination with apparatus as defined in claim 7, means for amplitude-modulating the output of said interpolation wave generator under control of information representative of amplitude variations of said original message wave.

9. In combination with a source of temporally irregular train of pulses of substantially like amplitudes, means for generating a wave of which the amplitude, in each interpulse interval, is inversely related to the duration of said interval, which comprises a temporary storage device, means for writing the pulses of said train into said device consecutively, means for reading stored pulses out of said device with magnitudes that increase monotonically with length of storage, means under control of each of the successive pulses of said train for picking the largest one of said pulses as read out of said device, and means for holding the magnitude of each picked pulse until the occurrence of the next picked pulse, whereby the duration of each such held pulse is equal to that of one interpulse interval of said train and the amplitude of each such held sample is inversely related to its duration.

10. In combination with a source of a temporally irregular train of pulses of substantially like amplitudes, means for generating a wave of which the amplitude, in each interpulse interval, is inversely related to the duration of said interval, which comprises means for deriving, from each of said pulses, a secondary train of signals that are equally spaced on the time scale and are monotomically graded in magnitude, means under control of each of the successive pulses of said original train for picking the largest one of said derived signals, and means for holding the magnitude of each such picked signal until the occurrence of the next such picked signal, whereby the duration of each such held signal is equal to that of one interpulse interval of said original train and the amplitude of each such held signal is inversely related to its duration.

11. In combination with a source of a temporally irregular sequence of pulses of substantially like amplitudes, means for generating a wave of which the amplitude, in each interpulse interval, is inversely related to the duration of said interval, which comprises a wave propagation device having an input point, an output point, and a plurality of lateral taps, a multiplier connected to each lateral tap proportioned to modify the amplitude of any output derived from said tap by a fixed quantity, means for applying said pulse sequence to said input point, means for continuously selecting the largest one of said multiplier outputs, means for deriving from said output point a delayed counterpart of said pulse sequence, means for deriving a sample of the output of said selecting means under control of each of said derived pulses, and means for holding the magnitude of each such sample until the inception of the next such sample, said multiplying factors being monotonically graded in magnitude from said input point to said output point, whereby the duration of each such held sample is equal to that of one interpulse interval of said train and the amplitude of each such held sample is inversely related to its duration.

12. Apparatus as defined in claim 11 wherein said selecting means comprises a bank of like, similarly poled unidirectionally conductive devices, each connected in series between one of said multipliers and a common point, and an impedance element interconnecting said common point with a point of fixed potential, whereby only that one of said devices is conductive which is connected to the multiplier momentarily delivering the largest output, the potential developed across said impedance element operating to hold all others of said devices in their cutoff states.

13. Apparatus defined in claim 11 wherein the several multipliers connected to the several lateral taps of the wave propagation device are proportioned to introduce, among the several fixed quantities by which each multiplier modifies the output derived from the tap to which it is connected, a hyperbolic grading law, whereby the relation between the amplitudes of the several held samples and their respective durations is one of inverse proportion.

References Cited in the file of this patent

UNITED STATES PATENTS

| | | |
|---|---|---|
| 2,672,512 | Mathes | Mar. 16, 1954 |
| 2,676,202 | Filipowsky | Apr. 20, 1954 |